United States Patent
Huang et al.

(10) Patent No.: US 7,353,379 B2
(45) Date of Patent: *Apr. 1, 2008

(54) METHODS FOR CONFIGURING A PLASMA CLUSTER TOOL

(75) Inventors: Chung-Ho Huang, San Jose, CA (US); Shih-Jeun Fan, San Jose, CA (US); Chin-Chuan Chang, Los Altos, CA (US)

(73) Assignee: Lam Research Corporation, Fremont, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 11/097,839

(22) Filed: Mar. 31, 2005

(65) Prior Publication Data

US 2006/0206223 A1    Sep. 14, 2006

Related U.S. Application Data

(60) Provisional application No. 60/656,862, filed on Feb. 25, 2005.

(51) Int. Cl.
*G06F 15/177* (2006.01)

(52) U.S. Cl. .............................. 713/100; 713/1; 713/2; 204/298.01; 438/5; 438/8; 438/907; 438/908; 118/696; 118/702; 700/90; 700/95; 700/96; 700/100

(58) Field of Classification Search ................ 713/1; 204/298.01
See application file for complete search history.

(56) References Cited

U.S. PATENT DOCUMENTS

| 5,914,879 | A  | * | 6/1999 | Wang et al. ................. 700/111 |
| 6,258,169 | B1 | * | 7/2001 | Asano ......................... 118/697 |
| 6,499,007 | B1 | * | 12/2002 | Kuroki et al. ................. 703/22 |
| 6,694,210 | B1 | * | 2/2004 | Toh ............................. 700/121 |
| 6,732,000 | B2 | * | 5/2004 | Tseng et al. ................. 700/108 |
| 2006/0178772 | A1 | * | 8/2006 | Thorgrimsson ............. 700/213 |

* cited by examiner

*Primary Examiner*—Nitin C. Patel
(74) *Attorney, Agent, or Firm*—IP Strategy Group, P.C.

(57) ABSTRACT

A method for configuring a plasma cluster tool is disclosed. The method includes generating a key file from option specifications, the key file encapsulating configuration restrictions specifically imposed on the plasma cluster tool. The method also includes generating at least one system-wide configuration file and at least one component-level configuration file using the key file. The method additionally includes generating run-time executable objects from a database of option definition files, the at least one system-wide configuration file and the at least one component-level configuration file. Furthermore, the method includes employing the run-time executable objects to configure the plasma cluster tool.

20 Claims, 10 Drawing Sheets

FIG. 1
Prior Art

| Sysconfig.txt | |
|---|---|
| - one per tool | - defines top level configuration parameters for entire cluster tool<br>  - define the number and types of processing modules<br>  - define the type of transfer module<br>  - define the type of user interface<br>  - define communication port<br>  - define mode (i.e., development or simulation)<br>  - define auto start (i.e., automatic or manual)<br>- contains file names of more detailed configuration for the modules<br>- MAC address<br>- Expiration date of the configuration file |

| Configoptions.txt | |
|---|---|
| - one per module | - defines identity of the major components (i.e., vacuum pump system, gas system, RF power system, chuck system, etc.)<br>  - define types<br>  - define vendor |

| Software Configuration Interface | | |
|---|---|---|
| PM1 | Version 1.6.4-SP3 – Build16 | |
| PM Type | Poly | TCP Voltage Probe | Peak Detection |
| PM Type Specification | None | Bias RF Generator Type | RFDS |
| Backside Shadow Ring | Not Installed | Bias Voltage Probe | 1200V (pre VCI-006) |
| Wafer Transfer Plane | Single Plane | OES | Installed |
| Wafer Size | 200 MM | Plasma Detection | N/A or VSWR (TCP Closed loop) |
| Exhaust Management System | Not Installed | DFC RF Generator Configuration | Two generators (2 and 27 MHz) |
| Roughing Pump Type | Edwards | ENI Generator Interface | None |
| Turbo Pump | Alcatel | 60 MHz Upper Match | Not Available |
| Chamber Manometre reading from VIOP | Not Available | Tunable ESC | Not installed |
| Gap | 1.6 cm | Tunable ESC FeedForward Feature | Disable |
| Confinement Ring Position Offset | Disable | ESC Type | Bipolar |
| Gas Box Type | Enhanced Gas Box | ESC Surface Roughness | Smooth |
| Gas Line Configuration | 8 Lines | Software Control Bias Compensation | Disable |
| Digital MFC | Installed | Wafer Backside Cooling Helium Control | Single Zone |
| Split Gas Injector | Not Installed | Second TCL for Top Plate | Not Installed |
| VODM | Not Installed | Chiller Interface | Standard LonWorks |
| Dual Gas Fee Type | None | Top Plate Heater Temperature Monitor for ESC & Top Plate Coolant | Not Installed |
| Toxic Tuning Gas Hardware (non IGS) | Not Installed | TCP Window Heating Options | Not Installed |
| Gas Name Mapping & Gas Interlock | Disable | Cooling Water Leak Detector(s) | Hardware not available |
| TCP RF Generator Type | Apex | | Installed |

| Advanced | Use Default | Save As Default | More Options... |
| <Back | Next> | Cancel | Help |

METHODS FOR CONFIGURING A PLASMA CLUSTER TOOL

The present invention claims priority under 35 USC 119(e) to a commonly-assigned provisionally filed patent application entitled "SECURE UNIVERSAL CONFIGURATION SOFTWARE FOR CLUSTER TOOLS," U.S. Application No. 60/656,862, filed Feb. 25, 2005 by the same inventors herein.

BACKGROUND OF THE INVENTION

Plasma processing tools have long been employed to process wafers and other miniature devices (e.g., flat panels, nanomachines, etc.). Cluster tools, representing variants of plasma processing tools, have been widely used. In a cluster tool, multiple processing chambers are clustered around one or more transfer modules. Each of the processing chambers is configurable for one or more specific processes. By moving the semiconductor substrate from processing chamber to processing chamber of a cluster tool, a manufacturer can subject the substrate to multiple processes and multiple processing recipes in a fairly short amount of time. Improved throughput is one of the advantages of using a cluster tool in a manufacturing environment.

Figure 1:
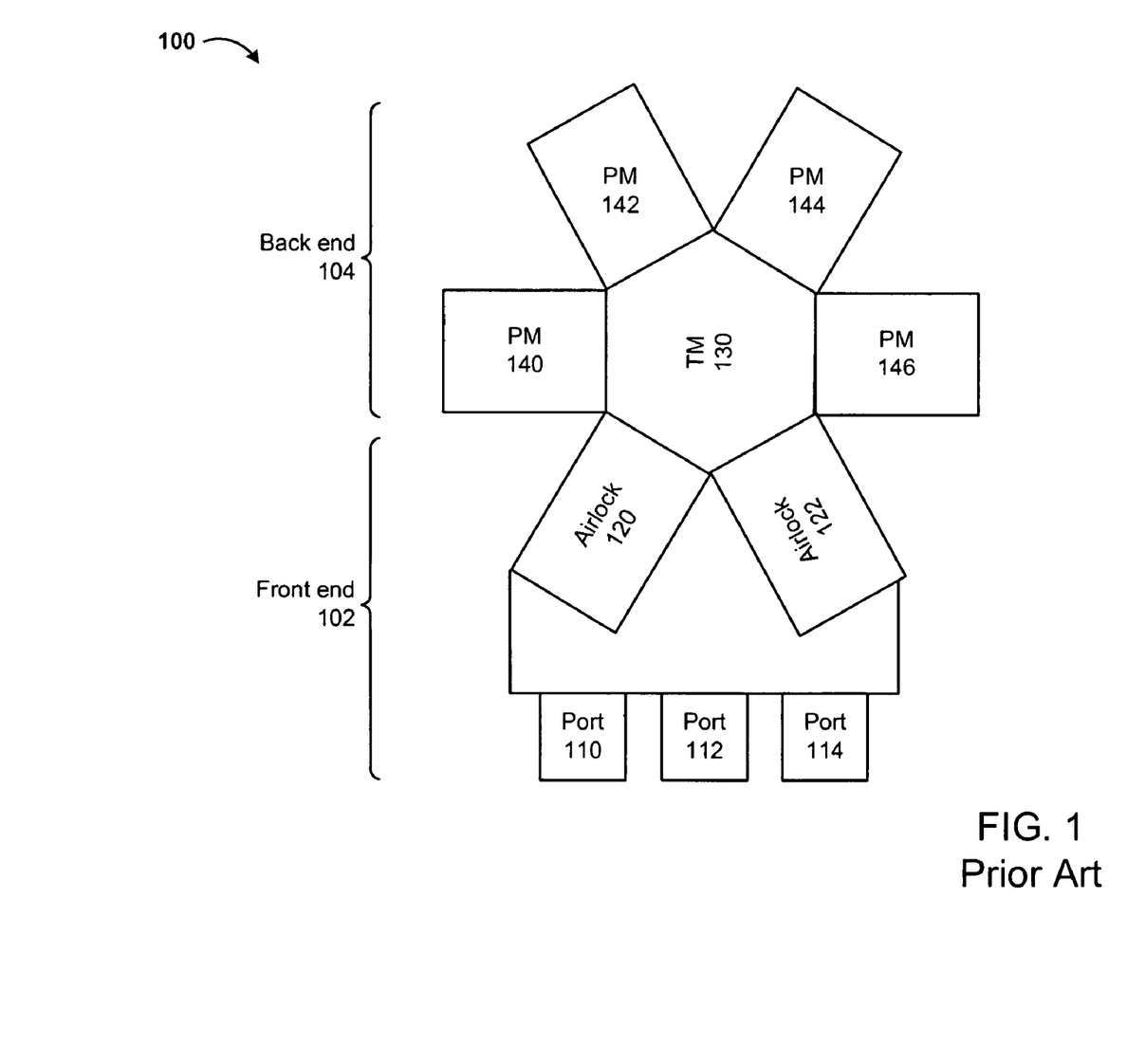
FIG. 1 shows a cluster tool, representing a high level, simplified logical representation of a typical cluster tool.

To facilitate discussion, FIG. 1 shows a cluster tool 100, representing a high level, simplified logical representation of a typical cluster tool. Cluster tool 100 includes a front end 102 and a back end 104. Front end 102 may be thought of as the portion of cluster tool 100 that is at atmospheric pressure and through which substrates may be inserted into and removed from the cluster tool. Back end 104 includes the actual process modules where the substrates are processed.

More specifically, front end 102 of FIG. 1 includes a plurality of ports 110, 112, and 114, representing ports for inputting substrates into and discharging substrates from cluster tool 100. The substrates then enter one of the airlocks 120 and 122, which maintain the pressure differential between back end 104 and front end 102. From airlocks 120 and 122, substrates are then transferred into a common transfer module (TM) 130, which serves as a common transfer point as substrates are shuffled among process modules (PM) 140, 142, 144, and 146. Each of process modules is configured to perform one or more specific processes using specific recipes. For examples, a process module may be configured for polysilicon etching, another process module may be configured for nitride deposition, and another process module of the same cluster tool may be configured for metal etching. Cluster tool 100 may include other modules (such as atmospheric processing module or APM), and other subsystems not shown in FIG. 1. As these and other major subsystems of a cluster tool are well known to those skilled in the art, the major subsystems will not be listed or discussed in details herein.

A cluster tool may differ from another cluster tool in the number of major subsystems (e.g., the number and/or type of processing modules). Furthermore, even if two cluster tools have an identical number of process modules of identical types, for example, these two cluster tools may still differ because the subsystems and subcomponents that make up these two cluster tools may be different. For example, two metal etch process modules may have different mass flow controllers or vacuum pumps.

To elaborate, a manufacturer of cluster tool 100, such as Lam Research Corporation of Fremont, Calif., typically utilizes subsystems and components from a number of third-party vendors in the manufactured cluster tool. In fact, such practice is standard in the semiconductor processing equipment field since it permits companies to focus on their strengths while delegating tasks outside of their fields of interest or expertise to other companies.

Accordingly, cluster tools are manufactured using different components and subsystems from different vendors. The decision regarding which components or which subsystems would be incorporated into a given cluster tool is a complex decision process, factoring in economics, pricing strategies, technical capabilities, changing technologies, customer requirements, competitive positioning, and/or other factors. Further, it is not unusual that cluster tools are improved with one or more new components monthly or quarterly. This factor, coupled with different customer requirements, results in a substantial likelihood that a cluster tool shipped by a manufacturer today may be different in some way from all other cluster tools shipped previously by that manufacturer. Yet, there is a common requirement to all cluster tools: the need to configure the cluster tool for use with appropriate configuration software and/or configuration files. Since most subsystems and components are electronically controlled, as is the case with all modem hardware, there is a need to configure the individual components/subsystems as well as the need to configure the components/subsystems in an assembled cluster tool to work together.

Traditionally, each cluster tool is provided with its own configuration software, which is custom-coded for the specific subsystems and components that make up the assembled cluster tool. Custom-coding is, however, both time-consuming and expensive. The delay and cost associated with the custom-coding affects users not only during the initial purchase phase but also at every update cycle when the cluster tool is updated with new subsystems and/or components. Over time, the need to maintain different configuration software programs for different versions of the cluster tool has become burdensome for manufacturers and users of cluster tools alike. For some manufacturers, the need to support literally hundreds of different versions of cluster tool configuration software has become a problem.

It is recognized by the inventors herein if a universal configuration tool can be created, manufacturers and/or users of cluster tools may be able to configure and support cluster tools with less time delay and cost. Furthermore, it is recognized by the inventors herein that a properly designed configuration tool may also be employed to prevent the use of unauthorized components/subsystems in a given cluster tool, may support different pricing structures based on the degree of configuration flexibility granted, may be employed to support efforts in cluster tool development and/or may be employed for simulation purposes. This application addresses such an improved cluster tool configuration tool.

SUMMARY OF THE INVENTION

In accordance with an aspect of the present invention, there are provided universal configuration tools (UCTs) that permit manufacturers and users of cluster tools to employ the same software to configure different cluster tools. The universal configuration tool advantageously relieves manufacturers and users from having to resort to different, custom-coded configuration software when installing and/or updating a cluster tool.

In another embodiment, the improved UCT supports different levels of flexibility to accommodate different customers, enabling the manufacturer to efficiently set the level of configuration flexibility provided to the customer, even on a component-by-component basis. This flexibility is advantageously provided without compromising the ability to employ a single software program to universally configure different cluster tools.

In another embodiment, the improved UCT provides a way for manufacturers of cluster tools to prevent unauthorized components from being used in the cluster tool. Unauthorized component usage may lead to the use of sub-standard components, which degrade processing results and/or damage the cluster tool. Furthermore, the improved UCT also includes mechanisms to prevent unauthorized usage of the UCT itself on cluster tools other than the cluster tool for which UCT usage is licensed. This prevents a user from licensing a single copy of the UCT and executing the UCT on different cluster tools.

In another embodiment, the improved UCT includes development assistant mechanisms designed to facilitate development of new components and/or capabilities. In another embodiment, UCTs provide users with unrestricted ability to simulate different cluster tools using different components to allow the user to explore different cluster tool configurations prior to purchase.

These and other features of the present invention will be described in more detail below in the detailed description of various embodiments the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

Appendix A provides, in an embodiment of the invention, a listing of an example sysconfig.txt file of a cluster tool.

Appendix B provides, in an embodiment of the invention, a listing of an example configoptions.txt file for an example process module.

Appendix C provides, in an embodiment of the invention, a listing of the system-wide configuration file (sysconfig.txt), representing the high level configuration details pertaining to the target cluster tool.

Appendix D provides, in an embodiment of the invention, a component-level configuration file (configoptions.txt) for the transfer chamber of an example cluster tool.

Appendix E provides, in an embodiment of the invention, an option definition file TMCImage.cfg reproduced for an example cluster tool.

Appendix F provides, in an embodiment of the invention, a listing of the aforementioned file TMCImageTMResD3Port.cfg for the example cluster tool.

Appendix G provides, in an embodiment of the invention, a definition file TMCImageTMResD2Port.cfg.

Appendix H provides, in an embodiment of the invention, an option definition file (pm.cfg) for a process module.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

For ease of discussion, the term "component" refers to an atomic or a multi-part assembly in a cluster tool. Thus, a component may be as simple as a gas line or may be as complex as the entire process module. A multi-part component (such as a process module) may be formed from other multi-part components (such as a vacuum system, a gas system, a power supply system, etc), which may in turn be formed from other multi-part or atomic components.

As mentioned, a cluster tool may differ from another cluster tool in the number of constituent components. Thus, a cluster tool with four processing modules would need to be configured differently from a cluster tool with three processing modules. The components themselves may differ from one cluster tool to another cluster tool based on many different aspects, such as type, capability, vendor, firmware, etc. For example, a vacuum pump may differ from another vacuum pump because of the difference in vendors (e.g., pump vendor A versus pump vendor B), types (e.g., roughing pump versus turbo pump), capabilities (e.g., different cubic feet per minute of pumping capacity), firmware (e.g., running vendor firmware version 2.0 versus 1.7). Accordingly, a cluster tool with a given vacuum pump may need to be configured differently than another cluster tool with another vacuum pump. The above examples are only illustrative and not intended to be comprehensive. One skilled in the art will readily recognize that the same considerations apply analogously to other components of the cluster tool.

Figure 2:
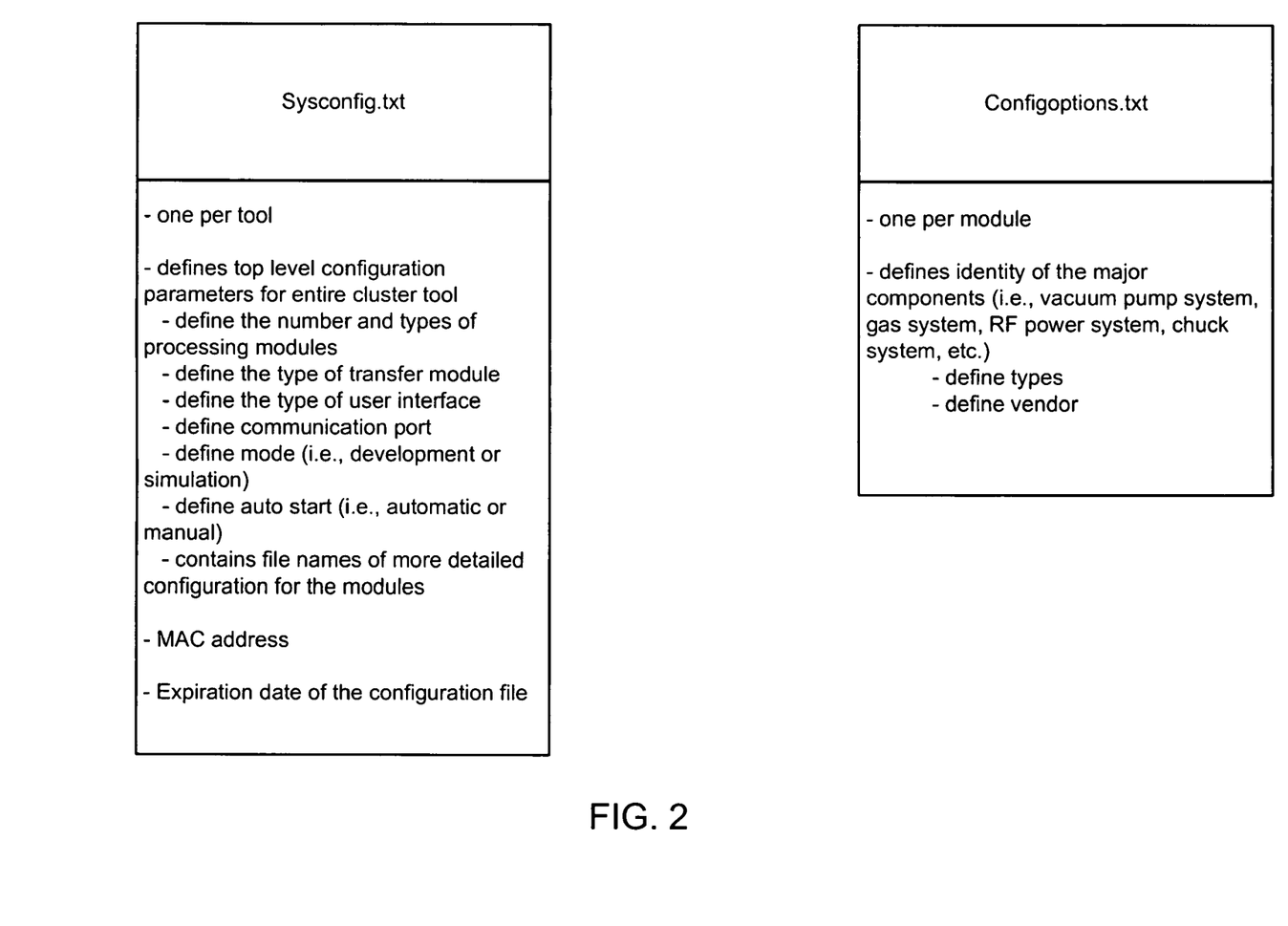
FIG. 2 shows, in an embodiment of the invention, a system-wide configuration file and a component-specific configuration file.

Generally speaking, each cluster tool is defined by two types of text files, a system-wide configuration file and a set of component-specific configuration files. In the example of FIG. 2 herein, the system-wide configuration file is named "sysconfig.txt" for ease of reference, and the component-specific configuration file is named "configoptions.txt". A system-wide configuration file (e.g., sysconfig.txt), as the name implies, defines the top-level configuration parameters for the entire cluster tool. Appendix A herein provides a listing of an example sysconfig.txt file for an example cluster tool.

There is typically one sysconfig.txt file per cluster tool, and the system-wide configuration file defines the number and types of processing modules, the type of transfer module, the cluster tool control software, etc. A tamper-resist mechanism is provided to prevent unauthorized tampering with sysconfig.txt file. In an embodiment, a checksum is calculated for the sysconfig.txt file to assist in detecting subsequent tampering although other tamper-resist arrangements may also be employed.

The system-wide configuration file contains, in an embodiment, the media access controller (MAC) address of the host computer that controls the cluster tool to be configured. The presence of the MAC address in the sysconfig.txt file enables detection when the UCT is executed on a different host computer (which may be associated with a cluster tool different from one intended). This feature protects the user from employing the wrong configuration file on the wrong cluster tool and protects the manufacturer of the UCT from piracy. Alternatively or additionally, the hard disk ID or digital certificate may be employed. Furthermore, the system-wide configuration file contains the expected expiration date of the configuration file, i.e., the date beyond which usage of the cluster tool and/or the instant system-wide configuration file is no longer authorized. The MAC address (and/or hard disk ID and/or digital certificate) and the expiration date form part of the protection arrangement designed to enforce compliance with licensing terms for the cluster tool and/or the UCT.

For each module, high level information such as the type of module (e.g., polysilicon etch or metal etch), the communication port (e.g., the IP address), whether the module is running in the development mode, whether the module is running in the simulated mode, whether the module is to be started automatically or manually, etc. The file names of the files that contain more detailed configuration information for the modules are also provided.

A component-specific configuration file (e.g., configoptions.txt) contains more detailed configuration information for a component, such as a processing module (PM), a transfer module(TM), or the cluster tool control software. Appendix B herein provides a listing of an example configoptions.txt file for an example process module.

There is typically one configoptions.txt file per module. Like the system-wide configuration file, a component-specific configuration file may also be provided with its own tamper-resist arrangement, such as a check-sum. The more detailed configuration information in a component-specific configuration file for a processing module may define information such as the identity of the major components therein (e.g., vacuum pump system, gas system, RF power system, chuck system, etc.). For the vacuum pump system, for example, the configoptions.txt for the processing module may identify the vendor (e.g., Alcatel) and the type (e.g., rough pump). For the gas system, for example, the configoptions.txt file for the processing module may identify the type (e.g., enhanced eight lines), whether split gas injectors are installed, whether digital mass flow controllers are installed, etc.

Figure 3A:
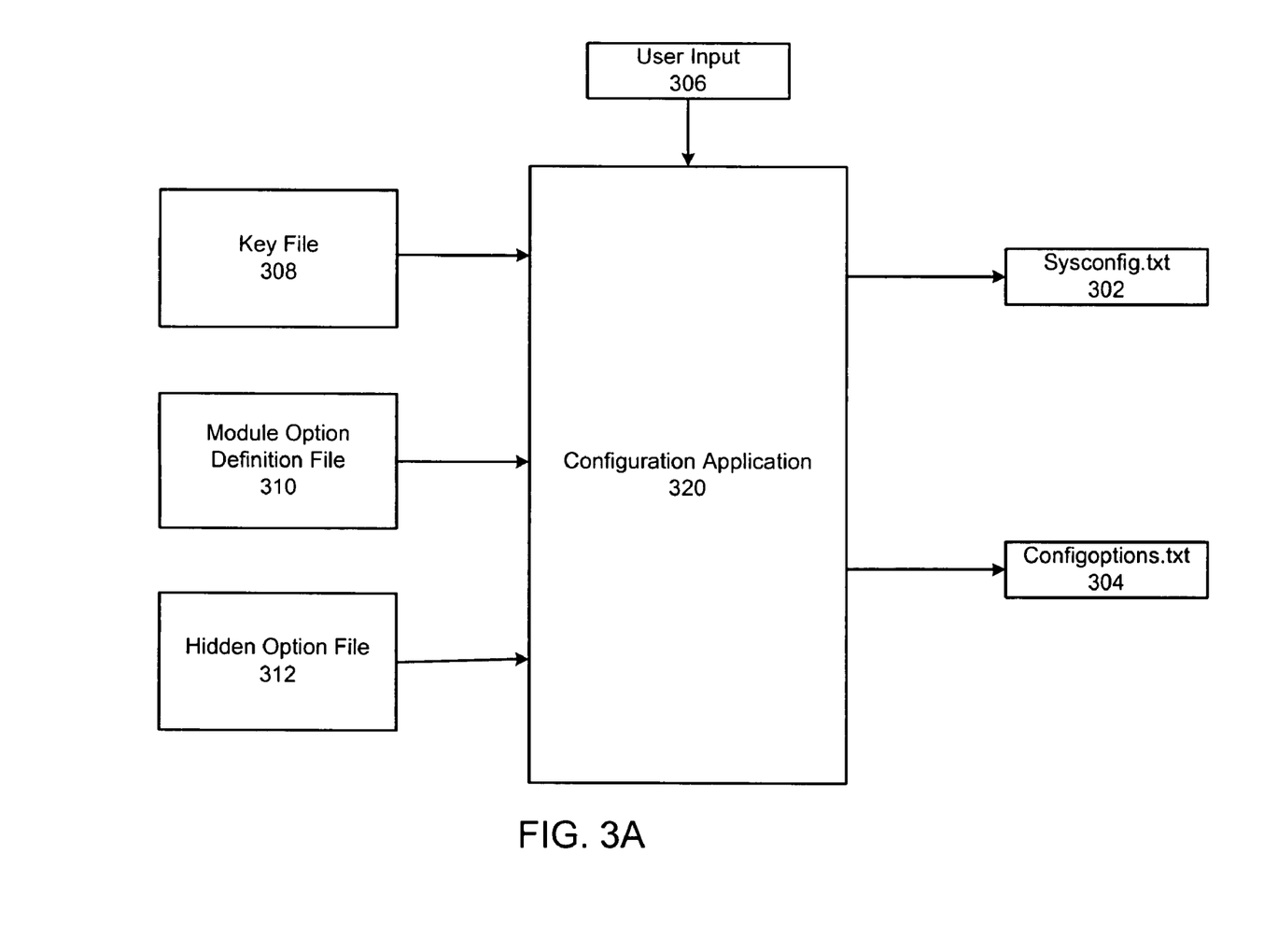
FIG. 3A shows, in an embodiment of the invention, a logical diagram of how a system-wide configuration file and sets of component-specific configuration files may be generated.

FIG. 3A is a logic diagram showing, in accordance with an embodiment of the present invention, how the system-wide configuration file (sysconfig.txt) 302 and the set of component-specific configuration files (configoptions.txt) 304 may be generated. These configuration files 302 and 304 are generated from four primary input sources: user input 306, key file 308, module option definition file 310, and hidden options file 312.

User input file 306 represents the set of inputs provided by the user (e.g., the customer service engineer responsible for the installation and/or update of the cluster tool) regarding proper configurations for the cluster tool, including any and all specifications, options, etc. These are the options selected for the cluster tool, which options require configuration before the cluster tool becomes operational.

Key file 308 (or a ".tcf" file in the present example) encodes the restrictions to the configuration. In other words, key file 308 contributes to the security implementation for the configuration. Since the UCT has configuration data for configuring all possible permutations of the cluster tool (which configuration data is stored in a database of components accessible by the UCT), key file 308 defined the range of configurable options allowed for the target tool.

Generally speaking, a component or an attribute may be unprotected, protected or hidden. For example, an unprotected component may be configured by the user without restriction. For example, if the component database includes six different turbo pumps and turbo pump is defined to be an unprotected component in the key file, the tool user can employ the UCT to configure any of the six turbo pumps. On the other hand, a protected component carries some restrictions with regard to configuration. Using the previous turbo pump example, if the licensing terms for the cluster tool and/or UCT only permits the tool user to configure the cluster tool with two specifically identified turbo pumps, key file 308 would contain the data that restricts permissible configuration to only the two designated turbo pumps. Of course, it is also possible to limit configuration to a single specific pump, if desired.

A component or an option for configuration thereof may have a "hidden" attribute. The hidden attribute is implemented to facilitate development since it allows an authorized user to configure the cluster tool with a component or a configuration option that is otherwise "hidden" from other users of the user base. In an example scenario, an authorized user (e.g., a support engineer or a customer who is authorized) is provided with the identity of the configuration option having the hidden attribute. Users not so authorized are unaware that this option even exist since the options having the hidden attribute are, in an embodiment, not even shown as a selection available for configuration. Hidden options are useful to control access to the "still-maturing" features in the software and/or hardware of the cluster tool by furnishing a mechanism that enables the manufacturer to selectively reveal the existence of certain hidden options only to certain customers (e.g., for development purposes).

Authorized users may specify one or more these options having the hidden attribute for configuration in user input 306 by providing the component identity. Hidden options thus assist in development since they enable selected users to test the cluster tool with new or untested configuration options that are unavailable to the rest of the user base. Hidden options 312 represents the list of options having the hidden attribute that a particular user is authorized to invoke for configuration.

Figure 3B:
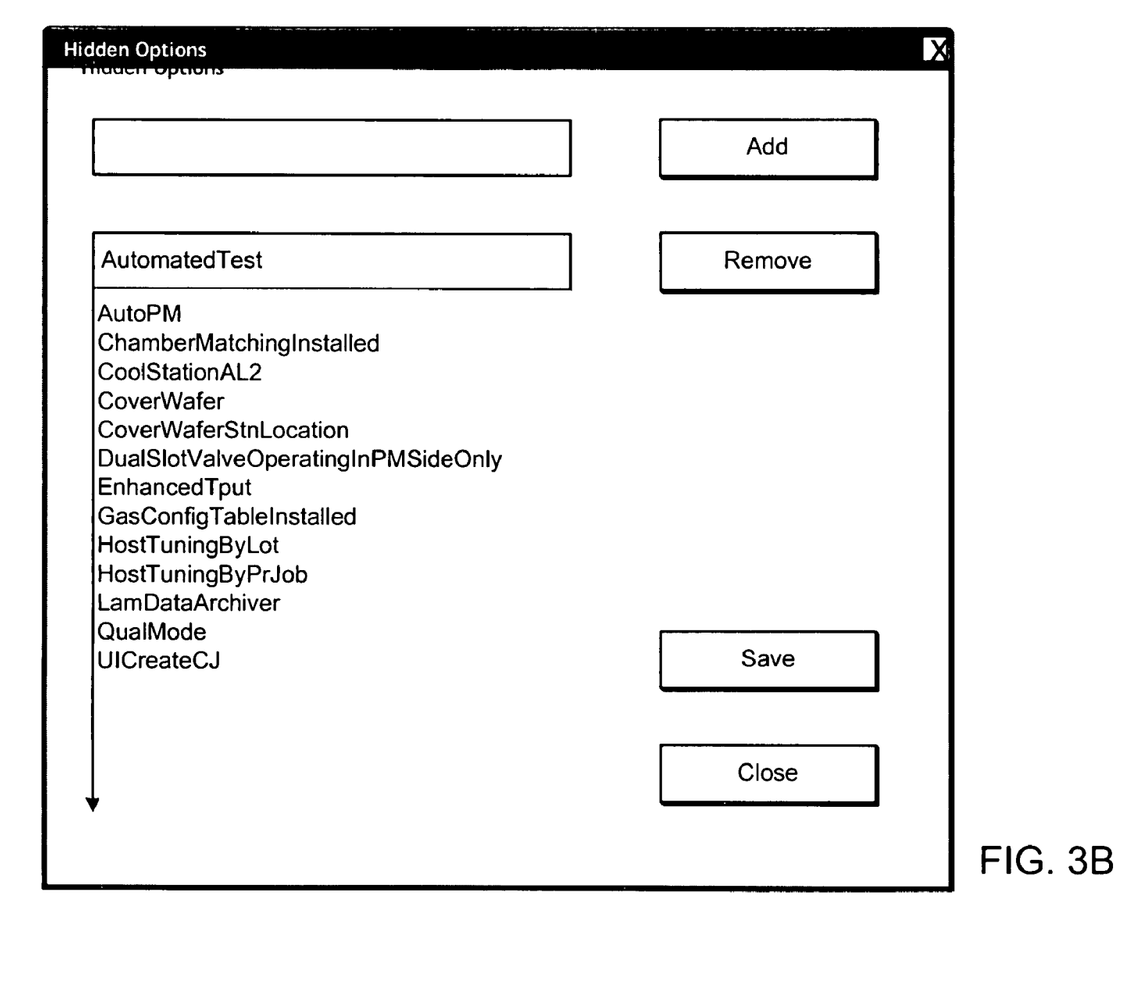
FIG. 3B shows, in an embodiment of the invention, an example of a user interface through which a user of a cluster tool may employ to gain access to one or more options or components having the hidden options.

FIG. 3B is an example of a user interface through which the user of the cluster tool may employ to gain access to one or more options or components having the hidden attribute. In the example of FIG. 3B, a list of options having the hidden attribute that the user is currently authorized to configure with is shown. If the manufacturer wishes to grant the user access to another option having the hidden attribute so that the additional configuration option may be employed to configure the cluster tool, the manufacturer may communicate the identity of the option with the hidden attribute and the user may enter (e.g., by typing) the name of the option with the hidden attribute into the dialog box next to the button "Add." If the entered identity matches one of the options having the hidden attribute, the user may then configure the cluster tool with that component.

Returning to FIG. 3A, key file 308 may also contain information regarding identity (e.g., the MAC address and/ or hard disk ID and/or digital certificate) of the host computer associated with the cluster tool to be configured. The identity of the host computer is embedded into the resultant system-wide configuration file, and is employed to make sure that the configuration is applied to the correct cluster tool. It should be noted that the host computer's MAC address represents only an example of how the identity of the cluster tool may be ascertained. In addition to the aforementioned hard disk ID and/or digital certificate, other techniques may be employed to identify a particular cluster tool (e.g., using unique identifying data read or sensed from the cluster tool).

Additionally, key file 308 may also contain the aforementioned expiration date. This expiration data is embedded into the resultant system-wide configuration file to provide data pertaining to the expected expiration date of the configuration file, i.e., the date beyond which usage of the cluster tool and/or the instant system-wide configuration file is no longer authorized. Note that the expiration date generally applies to the licensed options; there may be unlicensed options unaffected by the expiration date. Furthermore, it is possible to provide different expiration dates for different licensed options. Since key file 308 encapsulates important restriction information, key file 308 is typically an encrypted binary file to prevent possible tampering by the licensee/tool user.

Module option definition file 310 encapsulates the different configuration options available to configure a module (such as a process module, a transfer module, an atmospheric processing module, or a user-interface). In other words, module option definition file 310 represents the database of options available to configure each module, including options available to configure the constituent components in each module. A subset of these definitions is incorporated into the configoptions.txt, responsive to the configuration options input by the user in 306, the restrictions placed on configuration by key file 308, and hidden options 312. Like key file 308, module option definition file 310 is typically encrypted to prevent tampering by the licensee/tool user.

Figure 3C:
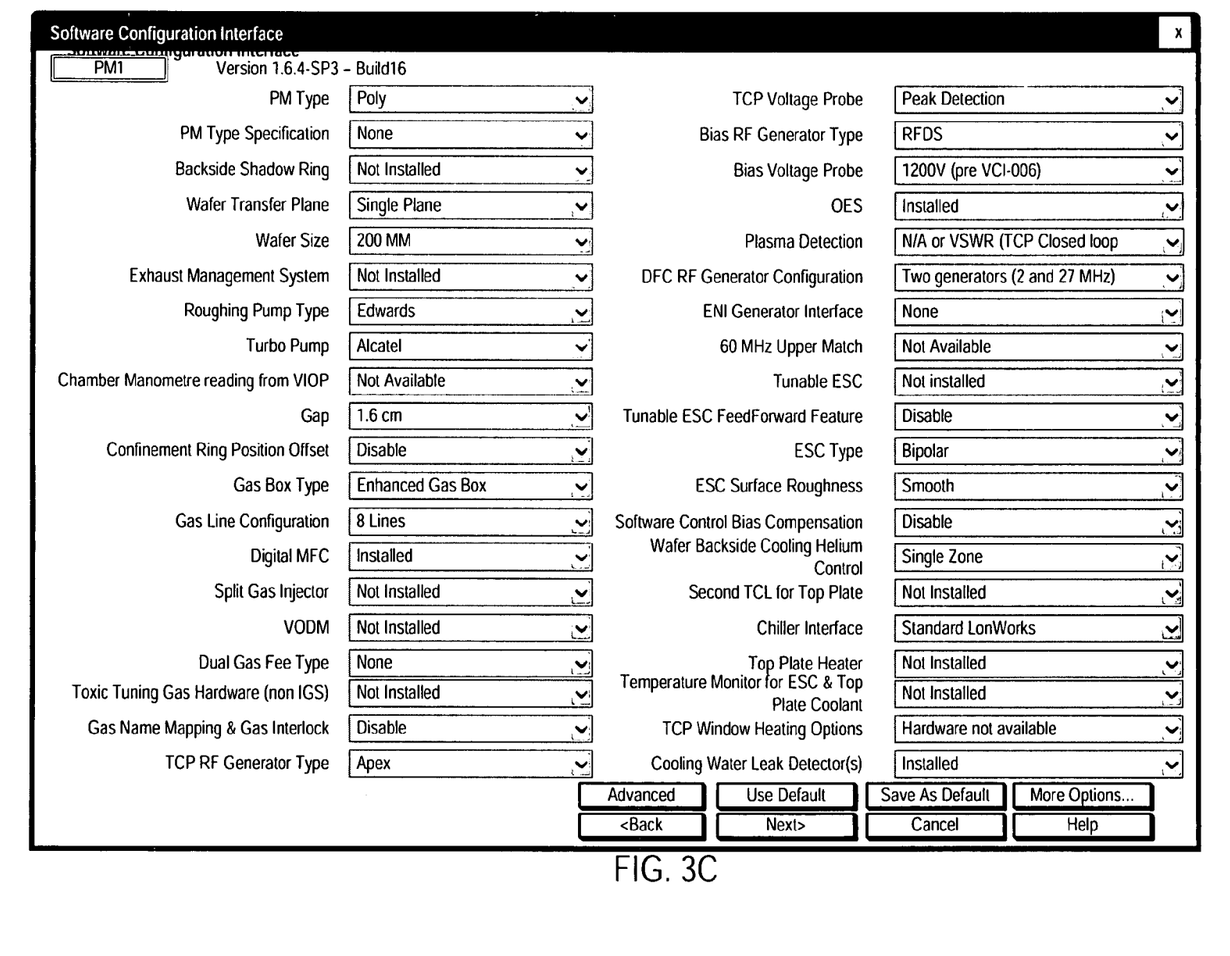
FIG. 3C shows an example user interface for allowing a user to enter, for a process module, data associated with user input, key file, module option definition file, and hidden options file.

Configuration application creates the system-wide configuration file 302 and the set of component-level configuration files 304 from the four input sources discussed above (e.g., user input 306, key file 308, module option definition file 310, and hidden options file 312). Configuration application 320 resides, in an embodiment, on the cluster tool to enable configuration of the cluster tool using the data files produced. FIG. 3C shows an example user interface for allowing a user to enter, for a process module, data associated with user input 306, key file 308, module option definition file 310, and hidden options file 312.

Figure 4:
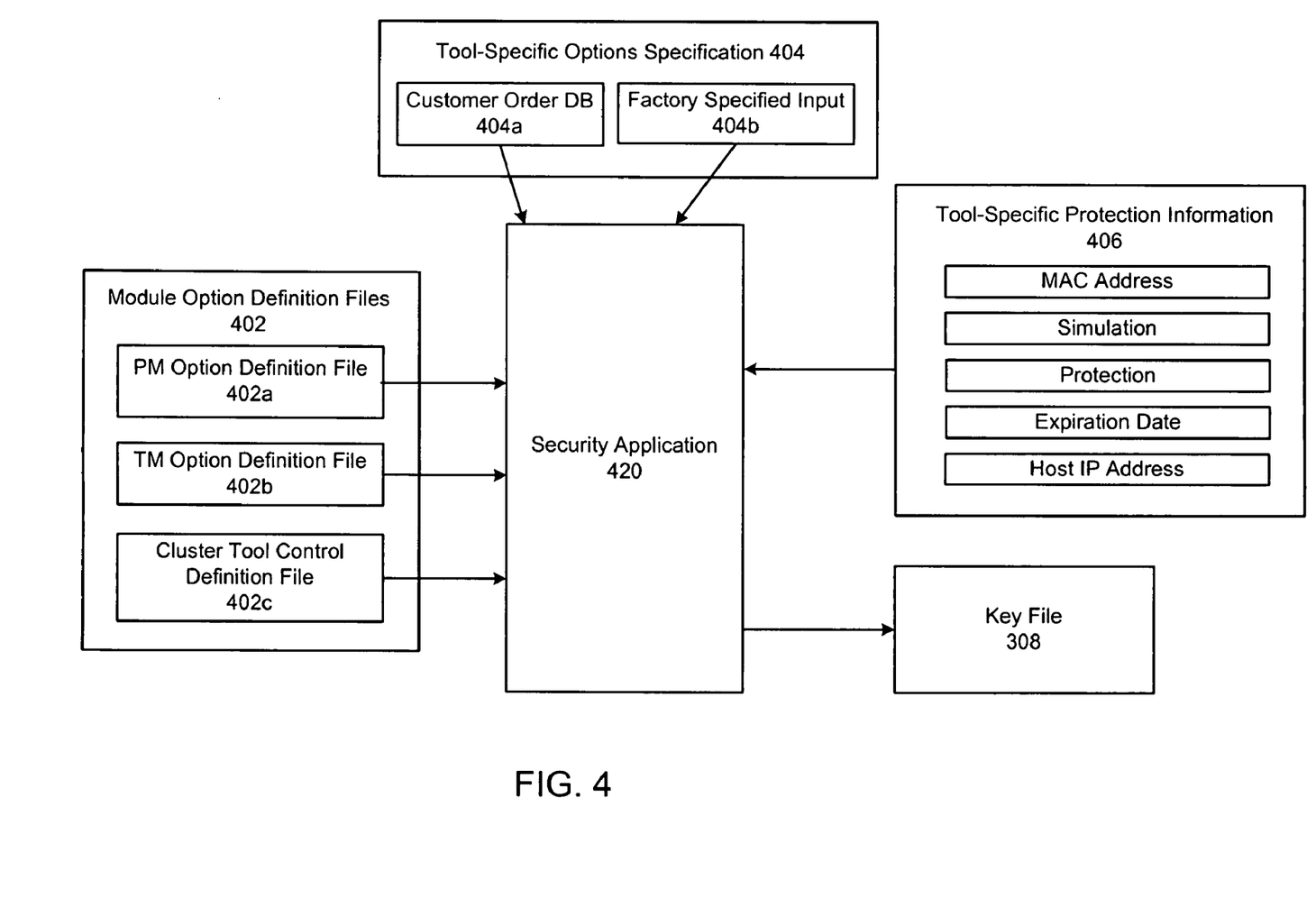
FIG. 4 shows, in an embodiment of the invention, how key file may be created.

FIG. 4 shows, in accordance with an embodiment of the present invention, how the key file 308 of FIG. 3 may be created. As discussed, key file 308 implements restrictions on configuration options as well as protection against unauthorized execution/piracy of the configuration software. Key file 308 is generated from three separate data sources: a set of module option definition files 402, tool-specific options specification 404, and tool-specific protection information 406.

Module option definition files 402 represent the configuration definition files for all modules (e.g., processing modules, transfer module, cluster tool control software, etc.). Accordingly, there are shown processing module option definition file 402a, transfer module option definition file 402b, and cluster tool control software option definition file 402c. Of particular interest for the creation of key file 308 are the protected options within module option definition files 402 since unprotected options are, by definition, unrestricted. For a particular cluster tool, options that are protected have the scope of their protection defined by key file 308. There exist a set of module option definition files 402 that are made available to configuring all cluster tools. The set of module option definition files 402 are continually updated as new configuration options are added and old configuration options are removed.

Tool-specific options specification 404 may come from a customer order database 404a or from factory specified input 404b. Tool-specific options specification 404 specifies the configuration option or options permitted for the components of a particular tool. As an example, the customer may purchase the option to install up to three different models of turbo pumps. The tool-specific options specification for the cluster tool purchased by the customer would then include configuration options for all three turbo pumps.

In an embodiment, customer ordering software by SAP is employed to take the customer order, which specifies the options the customer is interested in purchasing for components of the cluster tool. The information pertaining to the options desired by the customer may be obtained from the customer ordering software and employed as an input for specifying the options to be provided with components of the cluster tool. Alternatively or additionally, the options specification for the cluster tool may come from the manufacturer of the cluster tool. In this case, the specification may be obtained through discussion with the potential purchaser of the cluster tool, for example. As another example, the specification may be input by field engineers who seek to update a customer's cluster tool to solve a particular problem.

Tool-specific protection information 406 provides information for implementing protection against unauthorized execution/piracy of the resultant configuration software. As can be seen, tool-specific protection information 406 includes the MAC address (and/or hard disk ID and/or digital certificate) of the host computer that controls the cluster tool to be configured. This MAC address(and/or hard disk ID and/or digital certificate) may be obtained in advance from the customer, for example. Once this MAC address (and/or hard disk ID and/or digital certificate) is included in key file 308, key file 308 cannot be employed for configuration purposes on host computers having different MAC addresses (and/or hard disk IDs and/or digital certificates). Likewise, a key file (which is a required file for configuration) that lacks the matching MAC address (and/or hard disk ID and/or digital certificate) will not be usable for configuring a given cluster tool.

Tool-specific protection information 406 further includes the option to specify whether the resultant configuration software is in the simulation mode in which all options are available but only for simulation purposes. A flag to remove or enable protection for all protected option is also provided. This "protection" flag offers a way to globally specify whether protection is observed (e.g., in the case of production configuration software) or whether protection is ignored (e.g., when the resultant configuration files are produced for internal use by the cluster tool manufacturer and no protection is necessary). Expiration date of the resultant configuration software and the host IP address may also be provided in tool-specific protection information 406. During execution, these fields are checked against the current date and the acquired host IP address to ensure that licensing terms are complied with. The host IP address and/or the MAC address (and/or hard disk ID and/or digital certificate) also helps to ensure that configuration is performed on the intended cluster tool and not any other cluster tool.

In an embodiment, a security application 420 is employed to process the set of module option definition files 402, tool-specific options specification 404, and tool-specific protection information 406 in order to produce key file 308. In an embodiment, security application 420 is web-based to provide global access capability although the network aspect of security application is not always required.

Figure 5:
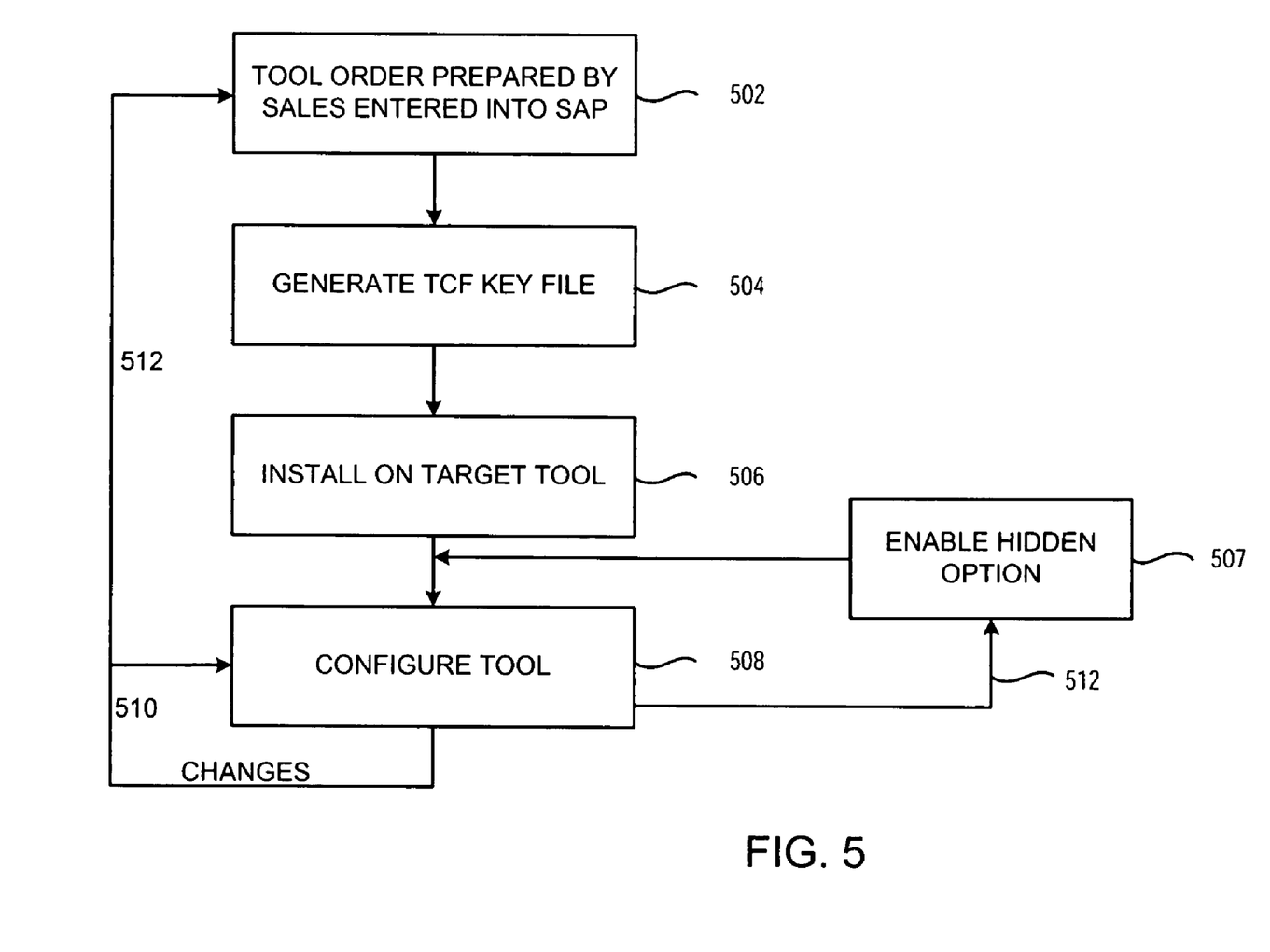
FIG. 5 shows, in an embodiment of the invention, a flowchart illustrating a typical configuration flow for a cluster tool

FIG. 5 is a flowchart illustrating a typical configuration flow for a cluster tool. In step 502, the tool order is taken from the customer. The configuration options purchased may then be employed to generate the key file in step 504. The generation of the key file has been discussed earlier in connection with FIG. 4, in accordance with an embodiment of the invention.

Once the key file is generated, the key file may be installed on the cluster tool (step 506) and employed along with hidden options (507) for configuring the cluster tool (step 508). Executing the configuration application on the cluster tool using the key file, the module option definition file, hidden options and user input configuration options result in the creation of system-wide configuration file and the set of component-specific configuration files. Generally speaking, each cluster tool is defined by two types of text files, a system-wide configuration file and a set of component-specific configuration files. The generation of these system-wide configuration file and the set of component-specific configuration files have been discussed in connection with FIG. 3, in accordance with an embodiment of the invention.

If the customer wishes to change one or more configuration options within the range of configuration options purchased, the customer may employ the same key file to re-configure the modified cluster tool. This update path is shown by arrow 510. If, however, the customer wishes to modify the cluster tool with options or utilize hidden options that are different from those already purchased, path 512 enables a new key file to be generated to enable the customer to re-configure the modified cluster tool. In the typical case, the generation of a new key file to enable customer's reconfiguration occurs during startup when protection is not enforced.

As can be appreciated from the foregoing, the invention enables a single set of application programs and a set of module option definition files to be employed to configure a wide range of cluster tools, each having specific configuration options. The need to custom-code and maintain a large number of configuration software applications is thus eliminated. The use of a key file in the manner discussed provides both flexibility and a high degree of control and protection for the cluster tool. Flexibility is provided since the cluster tool customer is free to re-execute the configuration application to employ different configuration options within the range of configuration options already purchased. Flexibility is further provided by the use of the simulation mode, which flag negates all the restrictions placed on configurability (which restriction is imposed due to pricing structure or licensing reasons) in order to allow the customer and/or user to simulate configuration and/or operation with "virtual" cluster tools. Similar flexibility is obtained using the development mode, which can be set by global flag or flags.

A high degree of control is provided since only options specified in the encrypted binary key file are available to a given cluster tool customer for configuration. Protection is provided in that the resultant configuration files can only be executed on the cluster tool having the expected MAC address and/or hard disk ID and/or digital certificate and/or host IP address.

The use of hidden options and protected/unprotected flags with the options also support development and simulation needs. Other information in the key file, such as the expiration date and/or other data supporting licensing enforcement may also be provided. In an embodiment, proprietary algorithms, components, and other resources may be kept confidential through the use of hidden options without compromising the philosophy of being able to configure all cluster tools without having to employ or maintain multiple versions of the configuration executable applications. For example, if a resource is intended to be confidential for a particular customer, the option associated with that resource is marked with the hidden flag, and the customer can only activate that resource if the exact name is known. In an embodiment, the activation/configuration of a hidden resource or one that is intended to be kept confidential may be safeguarded using a password procedure, which password is given only to the authorized customer by the manufacturer of the cluster tool.

It should be kept in mind that although flexibility is built into the algorithm for generating the system-wide configuration file (sysconfig.txt) and the set of component-specific configuration files (configoptions.txt), not all customers require the high degree of flexibility available. In an embodiment, the key file (.tcf) is generated automatically from the customer specification data (which specifies the options desired in the resultant cluster tool). The customer specification data may even be automatically extracted, in an embodiment, from the sales or customer ordering database, such as that offered by companies such as SAP (SAP.com). The customer specification may be specified directly by the customer as a file to be employed to generate the key file, in an embodiment.

Once the key file (.tcf) is obtained, the key file is then installed on the cluster tool hardware, which restricts the configuration application in the generation of the system-wide configuration file (sysconfig.txt) and the set of component-specific configuration files (configoptions.txt). As mentioned, the system-wide configuration file (sysconfig.txt) and the set of component-specific configuration files (configoptions.txt) specify the options that can be configurable on the target cluster machine. These authorized options may include, in an embodiment, hidden options as discussed earlier if hidden options are also provided along with the key file to the configuration application.

The system-wide configuration file (sysconfig.txt) and the set of component-specific configuration files (configoptions.txt) are then processed against a database of option definition files (.cfg files in an implementation) to generate instantiations of run-time executable objects. The database of option definition files represent the repository of all options available for all cluster tool types and components. By processing the system-wide configuration file (sysconfig.txt) and the set of component-specific configuration files (configoptions.txt) against the database of option definition files, only options that have been authorized result in run-time executable objects for configuring the cluster tool component hardware.

In this manner, the manufacturer of the cluster tool can employ the same set of applications (e.g., those employed to generate the key file, the system-wide configuration file and the set of component-specific configuration files, the instantiations of run-time executable objects, etc.) to configure any cluster tool having any component option specification. Further, the manufacturer has to maintain only a single database of option definition files (.cfg files), which can be employed as the universal, all (sysconfig.txt) and the set of component-specific configuration files that are uniquely generated for each cluster tool.

Figure 6:
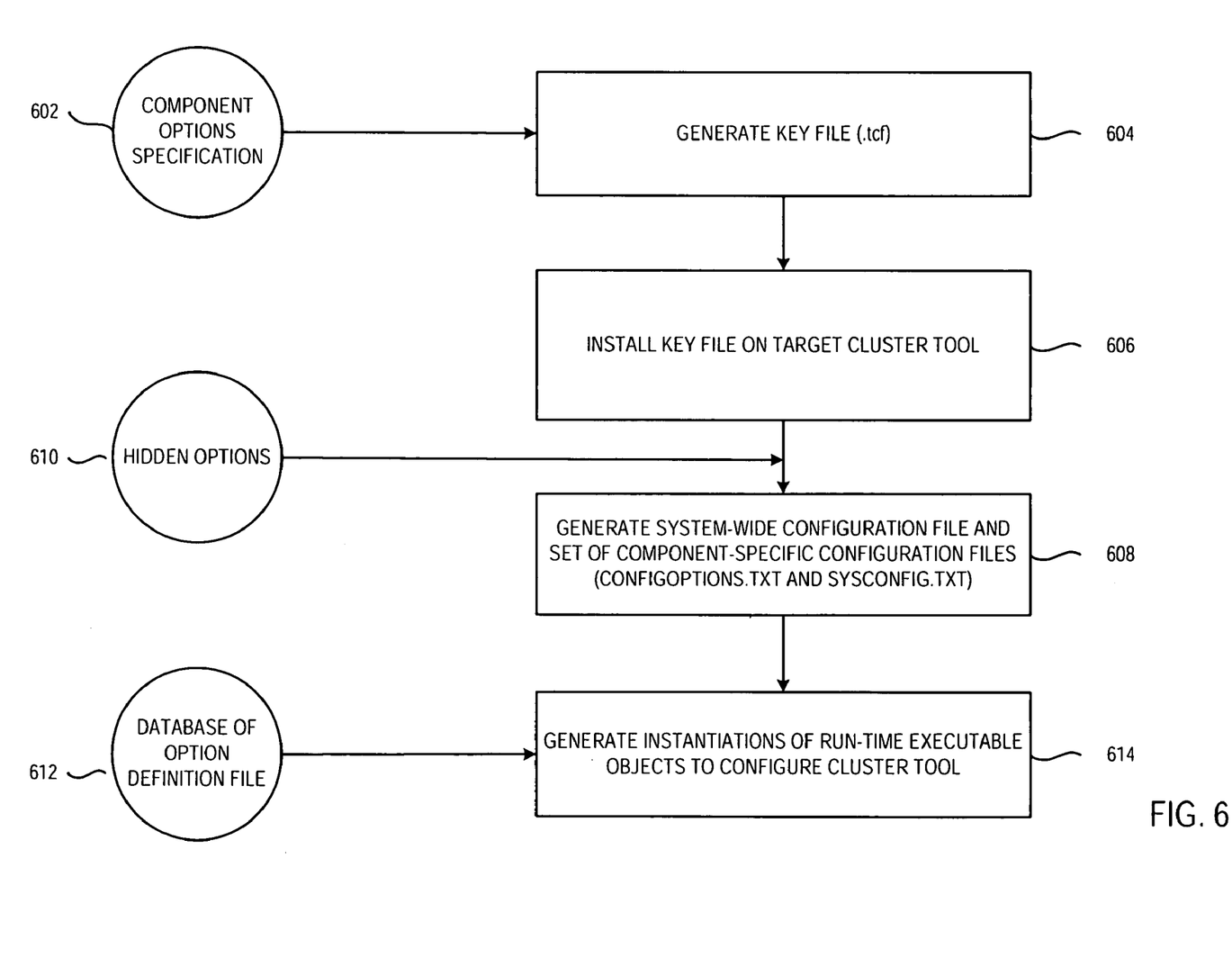
FIG. 6 shows, in an embodiment of the invention, a simplified flowchart for generating the run-time executable objects for configuring a cluster tool.

FIG. 6 shows, in an embodiment, a simplified flowchart for generating the run-time executable objects for configuring a cluster tool. In step 602, the component options specification (which may be obtained from the customer's cluster tool purchase order, for example) is employed to generate the key file (604). The generated key file is then installed on the target cluster tool (606). A configuration application on the target cluster tool then generates (608) the system-wide configuration file and the set of component-specific configuration files using the key file and optionally the provided hidden options (610).

The system-wide configuration file and the set of component-specific configuration files are then processed against the database of option definition files (612) to generate instantiations of run-time executable objects to configure the cluster tool.

Figure 7:
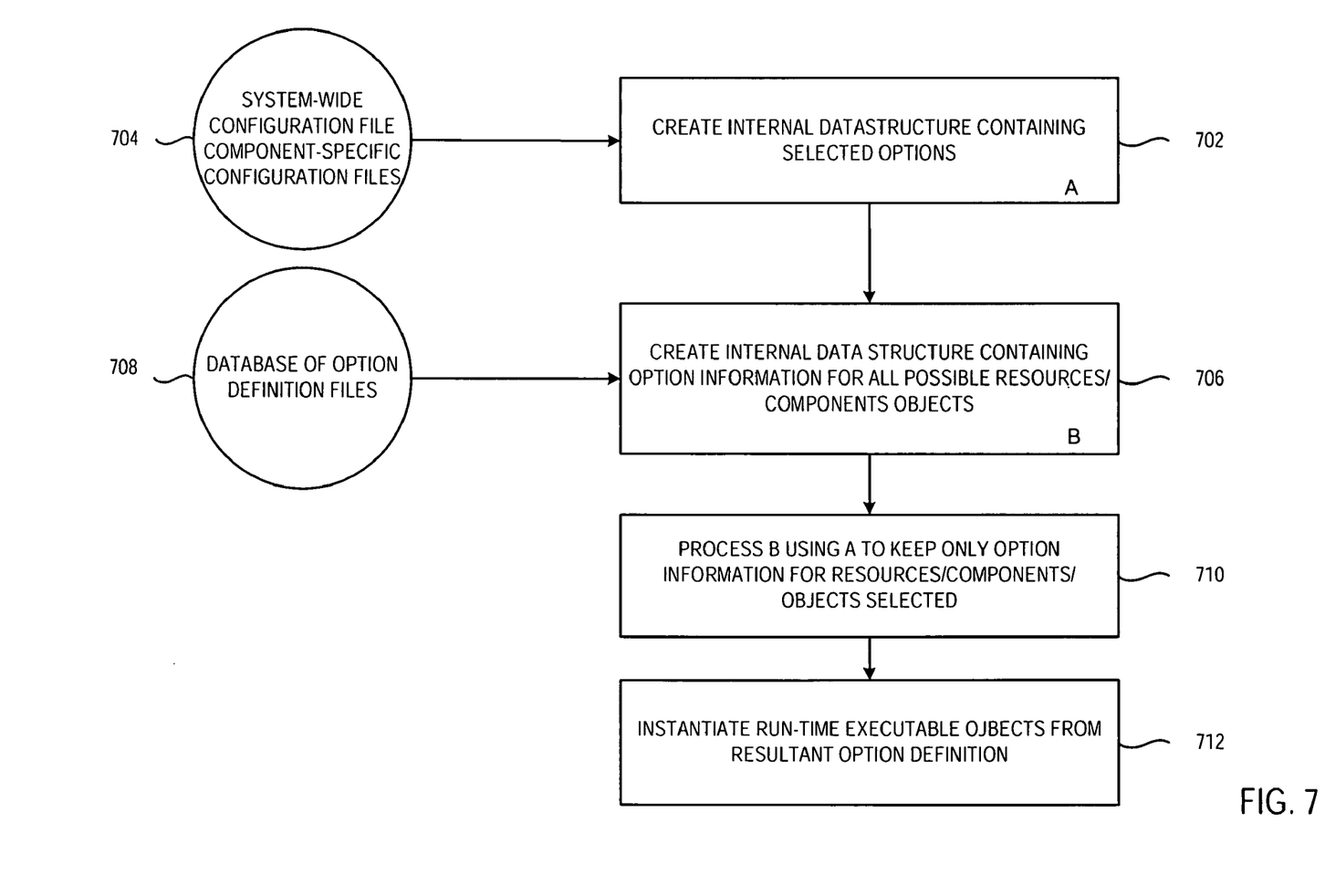
FIG. 7 shows, in an embodiment of the invention, a flow chart for generating the run-time executable objects to configure a cluster tool using an object-oriented approach.

In an embodiment, the generation of the run-time executable objects is accomplished using a suitable object-oriented approach and employing a suitable programming environment, such as Smalltalk (www.smalltalk.org). FIG. 7 shows, in accordance with an embodiment of the present invention, a flow chart for generating the run-time executable objects to configure a cluster tool using an object-oriented approach. In step 702, one or more internal data structure(s) are created to represent internally the selected/authorized options from the system-wide configuration file and the set of component-specific configuration files (704). In step 706, one or more internal data structure(s) are created to represent internally the option information for all possible resources/components/objects from the database of option definition files (708). In step 710, the set of data structures representing the option information for all possible resources/components/objects would be processed against the set of data structures representing the selected/authorized options. Step 710 represents the removal of option information pertaining to resources/components/objects that are not selected/authorized from the resultant set of data structures. In step 712, the run-time executable objects are instantiated from the remaining option definitions.

Appendix C (which includes pages C1, C2, and C3) illustrates, in accordance with an embodiment of the invention, a listing of the system-wide configuration file (sysconfig.txt), representing the high level configuration details pertaining to the target cluster tool. Section 1002 represents the meta-data section, which has data such as the Ethernet address of the host computer controlling the cluster tool, the expiration date of the configuration file, the protection flag, the simulation flag, expiration warning, etc. These meta-data have been discussed earlier. Section 1002 also indicates that the cluster tool platform is "#Domino3Ports". This platform identification is discussed later herein.

A plurality of image sections is also shown. The executable images associated with these sections pertain to the image for the host computer (HostImage), images for the four processing modules (PM1Image, PM2Image, PM3Image, PM4Image), and an image for the transfer module (TMCImage).

Each of these images includes various data fields such as the IP address, whether the hardware associated with the image exists, the file name where the cluster tool control software can be found if applicable, the communication port, the label of the image, the definition file (.cfg) of the image, the image file name, autostart flag (which automatically reconfigure upon power-up), the script if any for executing the image, the simulation flag, the development flag, the display scheme (which includes positioning, color, icon, etc.).

For discussion purposes, the image associated with the transfer module is selected for further discussion. Appendix D (which includes two pages D1, and D2) shows the component-level configuration file (configoptions.txt) for the transfer chamber of an example cluster tool. Section 1102 shows the meta-data for the transfer chamber, including the IP address (which matches that shown in meta-data section 1002 of Appendix C), the expiration date (which matches that shown in meta-data section 1002 of Appendix C), the module label "TransferChamber" (which matches the label associated with image TMCImage of Appendix C), and the platform "#Domino3ports" (which matches that shown in meta-data section 1002 of Appendix C).

In Appendix D, the left column shown the selected/authorized options, and the right column shows all the available options (some of which may not be authorized/selected for the specific target cluster tool). For example, the available choices for port PDO1 is #BrooksV4, #BrooksV3, #BrooksV2, #ErgoPD0, #ErgoPD0V1, #Ergo200 as shown on the right hand column. The left hand column shows that the available/selected option is #BrooksV4. Other selected options are self-explanatory.

Note that in the image associated with the transfer module in Appendix C indicates that the option definition file name for the transfer chamber is "TMCImage.cfg" This option definition file TMCImage.cfg is reproduced for an example cluster tool as Appendix E (which includes three pages, E1, E2, and E3). The option definition file contains configuration information for all options possible for the transfer module. For ease of maintenance and updates, the configuration information details may be further encapsulated in other modularized option definition files. For example, since the platform for the example cluster tool is #Domino3Ports (see meta-data sections 1002 of Appendix C and 1102 of Appendix D), page E3 of Appendix E indicates that additional configuration details may be obtained in the definition file with the name "TMCImageTMResD3Port.cfg"

Appendix F shows, in accordance with an embodiment, a listing of the aforementioned file TMCImageTMResD3Port.cfg for the example cluster tool. For comparison, the definition file TMCImageTMResD2Port.cfg (Appendix G) is also included, which would be employed and/or consulted if the platform had been selected to be #Domino (per page E3 of Appendix E). Also for comparison purposes, an option definition file (pm.cfg) (Appendix H) for a process module is also included as an example, which option definition file would be employed and/or consulted to ascertain the configuration details for the process modules of the target cluster tool (based on the options selected/authorized as indicated in the system-wide configuration file sysconfig.txt and the component-level configuration file configoptions.txt for the process module, e.g., PM1, PM2, PM3, or PM4.

As mentioned, the database of option definition files includes the configuration information for all possible components. For ease of reference, the term "resources" will be employed herein to refer to any software or hardware and/or process-related features that can be configured in the cluster tool. For example, a single hardware component may have different parameters that can be configured. Each of these configurable parameters represents a resource.

One of the challenges in creating a universal configuration architecture relates to the need to store configuration data for all possible resources to satisfy any option selected/authorized, while at the same time rendering the process of filtering the database using the selected options files (e.g., the system-wide configuration file and the set of component-level configuration file) efficient (the filtering process is part of the process of creating the run-time executable objects for the selected/authorized options). This challenge is made more difficult by the fact that software/hardware resources change all the time, and updates to software/hardware components result in new definitions being incorporated into the database and old definitions deleted therefrom.

In accordance with an embodiment of the invention, the resource definitions in the database are organized in a hierarchical format to substantially mirror the organization of a generic cluster tool that has all possible options authorized/selected. As an example, the applicable resource definitions for all sensors of a given match system are deemed owned by (in the ownership sense) that match system. At the same level in the hierarchy, the applicable resource definitions for all actuators of a match system are deemed owned by that match system. At the next higher-up level, all match systems are deemed owned by RF (Radio Frequency) systems. At the same level in the hierarchy, all RF electrodes are deemed owned by RF systems. At the next higher-up level, all RF systems are deemed owned by processing modules. At the same level in the hierarchy, all chuck systems are deemed owned by processing modules. At the next higher-up level, all processing modules are deemed owned by the cluster tool. At the same level in the hierarchy, the transfer module is also deemed owned by the cluster tool.

Note that some of the resources may be properly associated with, or owned by, a higher level resource but may not be associated with, or owned by, a higher level resource. For example, a RF system may be owned by a inductively-coupled processing module, but may not be properly owned by, or associated with, a microwave processing module. The specifics pertaining to the resources should be taken into account when creating linkages in the database between a higher level resource and a resource at a lower level of the hierarchy.

Figure 8:
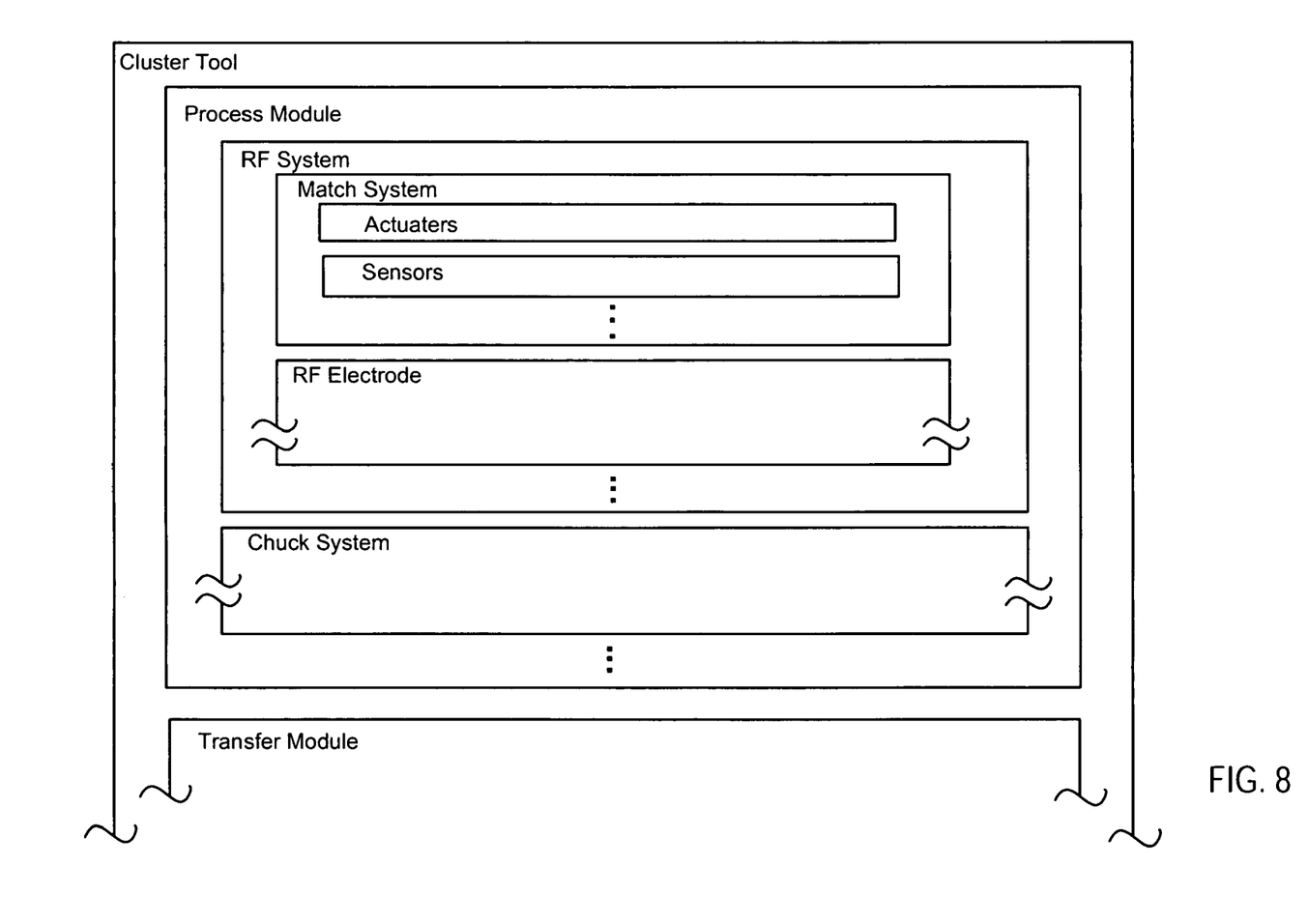
FIG. 8 shows, in accordance with an embodiment, a logical diagram of the hierarchical organization of the database of option definition files, following the organization discussed above.

FIG. 8 shows, in accordance with an embodiment, a logical diagram of the hierarchical organization of the database of option definition files, following the organization discussed above.

The ownership linkage is made, in an embodiment, by referencing the file name that contains the configuration definition of the "ownee" in the text of the owner. An example of this linkage is seen earlier in the Appendices whereby the option definition file name for the transfer chamber, TMCImage.cfg, to seen in the text of the system-wide configuration file sysconfig.txt of Appendix C. When details pertaining to an "ownee" needs to be updated, the file that is associated with the "ownee" resource may be replaced with an identically named file containing the updated configuration information. When a new option is provided for the cluster tool for selection, the configuration details pertaining to the new option may be saved in a file in the database, and the name of the new option file may be provided in the body of the owner as another option for possible selection. When an option is obsolete and removed, the file associated with the option may be removed from the database and any linkage to it may be deleted from the body of its owner(s).

In this manner, the database may be efficiently maintained in view of changing resource definitions. Furthermore, the hierarchical organization renders it efficient to process the selected/authorized options (as indicated in the system-wide configuration file sysconfig.tx and the component-level configuration file configoptions.txt) against the database of option definition files. In an embodiment, the processing follows a tree-traversal algorithm, with the algorithm drilling down from a higher level to the lowest level in the hierarchy until all configuration definitions are resolved.

For example, if a cluster tool has only one metal etch process module and no other modules, the configuration definitions of that metal etch process module is drilled down starting from the system-wide configuration file sysconfig.tx and the component-level configuration file configoptions.txt for that metal etch process module until all configuration definitions are resolved (i.e., all file name references in the drill-down path is resolved). Once they are resolved, the algorithm proceeds to resolve configuration definitions for the transfer module by drilling down starting from the system-wide configuration file sysconfig.tx and the component-level configuration file configoptions.txt for the transfer module.

Note that this tree-traversal algorithm will avoid drilling down on details of the non-existent polysilicon etch process module. Furthermore, the tree-traversal algorithm will stop when all file references have been resolved. While drilling down a given path, configuration details associated with branches of the tree that are associated with options not selected or not authorized are bypassed. In this manner, the configuration details can be obtained quickly by processing the hierarchical database of option definition files against the selected/authorized options indicated in the system-wide configuration file sysconfig.tx and the component-level configuration files configoptions.txt. These configuration details are then employed to create run-time executable objects for configuring the target cluster tool.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for configuring a plasma cluster tool, comprising:
   generating a key file from option specifications;
   installing said key file on hardware of said plasma cluster tool;
   generating at least one system-wide configuration file and at least one component-level configuration file using said key file, said key file encapsulating configuration restrictions specifically imposed on said plasma cluster tool;
   generating run-time executable objects from a database of -option definition files, said at least one system-wide configuration file, and said at least one component-level configuration file; and
   employing said run-time executable objects to configure at least hardware of at least a component of said plasma cluster tool.

2. The method of claim 1 wherein said database of -option definition files includes configuration information for all possible resources that can be configured for said plasma cluster tool.

3. The method of claim 1 wherein said key file encapsulates data that limits the degree of configurability of said plasma cluster tool.

4. The method of claim 1 wherein said key file includes a first Media Access Controller (MAC) address associated with said plasma cluster tool, said generating said run-time executable objects is inhibited if said at least one system-wide configuration file and said at least one component-level configuration file were installed on a plasma cluster tool that does not have a MAC address matching said first MAC address.

5. The method of claim 1 wherein at least a subset of resources that can be configured in said database of option definition files are associated with protected flags.

6. The method of claim 1 wherein said key file is encrypted.

7. The method of claim 1 further comprising:
   providing a hidden options file, said hidden options file including a set of hidden configuration options that are generally hidden from users not specifically informed of said hidden configuration options; and
   employing said hidden options file in generating at least one system-wide configuration file and said at least one component-level configuration file.

8. The method of claim 1 wherein said at least one system-wide configuration file defining a type of a transfer module of said plasma cluster tool and defining a mode of a processing module of said plasma cluster tool.

9. The method of claim 8 wherein said mode is a simulation mode of said processing module of said plasma cluster tool.

10. The method of claim 1 wherein said at least one component-level configuration file includes a first file and a second file, said first file containing a first set of component data pertaining to a first processing module of said plasma cluster tool, said second file containing a second set of component data pertaining to a second processing module of said plasma cluster tool.

11. The method of claim 10 wherein said at least one component-level configuration file further includes a third file, said third file containing a third set of component data pertaining to a transfer module of said plasma cluster tool.

12. The method of claim 10 wherein said first set of component data identifies components of said first processing module of said plasma cluster tool, and said first set of component data further identifies vendors and types of said components of said first processing module of said plasma cluster tool.

13. The method of claim 1 wherein said key file contains a first expiration date associated with a first configuration file pertaining to a first processing module of said plasma cluster tool and a second expiration date associated with a second configuration file pertaining to a second processing module of said plasma cluster tool.

14. The method of claim 1 wherein said key file contains an expiration date associated with a configuration file pertaining to a transfer module of said plasma cluster tool.

15. The method of claim 1 wherein said key tile contains a first expiration date and a second expiration date, the first expiration date being associated with a first licensed option pertaining to a component of a first processing module of said plasma cluster tool, said second expiration date being associated with a second licensed option pertaining to a component of a second processing module of said plasma cluster tool.

16. The method of claim 1 wherein said key file contains an expiration date associated with a licensed option pertaining to a component of a transfer module of said plasma cluster tool.

17. The method of claim 1 wherein said at least one component-level configuration file pertains to a user interface of a first processing module of said plasma cluster tool and a user interface of a second processing module of said plasma cluster tool.

18. The method of claim 1 wherein said one or mow component-specific configuration files pertain to a user interface of a transfer module of said plasma cluster tool.

19. The method of claim 1 wherein said key file contains identity information pertaining to a host computer configured to control said plasma cluster tool, said identify information being embedded in said at least one system-wide configuration file, said at least one system-wide configuration file defining a communication port for communication between said host computer and said plasma cluster tool.

20. The cluster tool of claim 19 wherein said at least one system-wide configuration file contains one or more file names of said at least one component-level configuration file.

* * * * *